(12) United States Patent
Miao

(10) Patent No.: US 12,155,484 B2
(45) Date of Patent: Nov. 26, 2024

(54) HARQ PROCESS ID DETERMINATION METHOD AND APPARATUS, TERMINAL, AND MEDIUM

(71) Applicant: DATANG MOBILE COMMUNICATIONS EQUIPMENT CO.,LTD., Beijing (CN)

(72) Inventor: Jinhua Miao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 913 days.

(21) Appl. No.: 17/279,598

(22) PCT Filed: Sep. 2, 2019

(86) PCT No.: PCT/CN2019/104055
§ 371 (c)(1),
(2) Date: Mar. 25, 2021

(87) PCT Pub. No.: WO2020/063266
PCT Pub. Date: Apr. 2, 2020

(65) Prior Publication Data
US 2021/0336727 A1    Oct. 28, 2021

(30) Foreign Application Priority Data
Sep. 28, 2018    (CN) .......................... 201811143471.2

(51) Int. Cl.
*H04L 1/18*    (2023.01)
*H04L 1/1607*    (2023.01)
(Continued)

(52) U.S. Cl.
CPC .......... *H04L 1/1819* (2013.01); *H04L 1/1642* (2013.01); *H04W 72/0446* (2013.01); *H04W 72/23* (2023.01)

(58) Field of Classification Search
CPC . H04W 74/0808; H04W 16/14; H04W 72/21; H04W 72/23; H04L 1/1812;
(Continued)

(56) References Cited

U.S. PATENT DOCUMENTS 10,382,170 B2 *  8/2019  Babaei .................. H04L 1/1822
10,499,386 B2 * 12/2019  Ying ........................ H04L 1/16
(Continued)

FOREIGN PATENT DOCUMENTS

CN    101874377 A    10/2010
CN    106301711 A    1/2017

OTHER PUBLICATIONS

Huawei et al., "UL data transmission procedure without UL grant", 3GPP TSG RAN WG1 Meeting #91, Reno, USA, Nov. 27-Dec. 1, 2017, total 14 pages, R1-1719411.
(Continued)

Primary Examiner — Jung Liu
(74) Attorney, Agent, or Firm — Kilpatrick Townsend & Stockton LLP

(57) ABSTRACT

The present application can provide a method for determining an HARQ process ID. The method comprises: a terminal device determining a target parameter, the target parameter being the index number of a configured grant configuration or time Domain Offset configured in a configured grant configuration or HARQ process information configured in a configured grant configuration; and determining, according to the target parameter, the HARQ process ID of each HARQ process corresponding to the configured grant configuration.

13 Claims, 4 Drawing Sheets

```
determining, by a terminal device, a target          S301
                    parameter determining, by the terminal device, an HARQ
process ID of an HARQ process corresponding to       S302
the configured grant configuration according to the
                 target parameter
```

(51) Int. Cl.
*H04L 1/1812* (2023.01)
*H04W 72/0446* (2023.01)
*H04W 72/23* (2023.01)

(58) Field of Classification Search
CPC ....... H04L 1/1887; H04L 1/0061; H04L 1/16; H04L 5/0044; H04L 1/1657; H04L 1/189; H04L 1/1896; H04L 5/003; H04L 5/0007; H04L 1/0045
See application file for complete search history.

(56) References Cited

U.S. PATENT DOCUMENTS

| | | | | |
|---|---|---|---|---|
| 10,542,529 | B2* | 1/2020 | Dinan | H04W 52/04 |
| 10,601,551 | B2* | 3/2020 | Ying | H04L 1/08 |
| 10,602,488 | B2* | 3/2020 | Rico Alvarino | H04W 4/70 |
| 10,701,677 | B2* | 6/2020 | Park | H04W 74/0816 |
| 10,986,631 | B2* | 4/2021 | Xiong | H04W 72/21 |
| 11,569,944 | B2* | 1/2023 | Oh | H04L 1/08 |
| 2017/0118747 | A1* | 4/2017 | Rico Alvarino | H04L 1/1861 |
| 2017/0223674 | A1* | 8/2017 | Dinan | H04L 1/1887 |
| 2017/0322358 | A1* | 11/2017 | Ueki | G02B 5/3025 |
| 2018/0014284 | A1 | 1/2018 | Yi et al. | |
| 2018/0049217 | A1 | 2/2018 | Dinan et al. | |
| 2018/0049229 | A1 | 2/2018 | Dinan et al. | |
| 2018/0323909 | A1* | 11/2018 | Ying | H04L 1/1822 |
| 2018/0368117 | A1* | 12/2018 | Ying | H04L 1/0061 |
| 2019/0053211 | A1* | 2/2019 | Ying | H04W 72/044 |
| 2019/0313436 | A1* | 10/2019 | Lee | H04L 5/0051 |
| 2020/0021402 | A1* | 1/2020 | Xu | H04L 1/1887 |
| 2020/0045733 | A1* | 2/2020 | Tiirola | H04W 74/0808 |
| 2020/0252917 | A1* | 8/2020 | Zhang | H04W 72/23 |
| 2020/0383089 | A1* | 12/2020 | Goto | H04L 1/1822 |
| 2021/0136729 | A1* | 5/2021 | Yasukawa | H04L 1/1887 |
| 2023/0163882 | A1* | 5/2023 | Bae | H04W 72/0446 370/328 |

OTHER PUBLICATIONS

Zte, "Consideration on the multiple SPS and grant free", 3GPP TSG-RAN WG2 Meeting# NR_AdHoc#2, Qingdao, China, Jun. 27-29, 2017, total 5 pages, R2-1706645.

Broadcom Corporation, "DL SPS HARQ process ID issue when SFN wraps around", 3GPP TSG RAN WG2 Meeting #77bis, Jeju, South Korea, Mar. 26-30, 2012, total 7 pages, R2-121705.

* cited by examiner

… (1)

HARQ PROCESS ID DETERMINATION METHOD AND APPARATUS, TERMINAL, AND MEDIUM

CROSS-REFERENCE OF RELATED APPLICATIONS

The present application is a national phase entry under 35 U.S.C. § 371 of International Application No. PCT/CN2019/104055, filed on Sep. 2, 2019, which claims the priority from Chinese Patent Application No. 201811143471.2, filed on Sep. 28, 2018, in the China National Intellectual Property Administration and entitled "HARQ Process ID Determination Method and Apparatus, Terminal, and Medium", which is hereby incorporated by reference in its entirety.

FIELD

The present application relates to the field of wireless communication technology, and in particular to a method and apparatus for determining an HARQ process ID, a terminal and a medium.

BACKGROUND

In the next-generation New Radio (NR) system, the network side can pre-configure some Uplink (UL) resources or Downlink (DL) resources, so that the UE can transmits data in parallel through Hybrid Automatic Repeat reQuest (HARQ) processes in accordance with the resource locations configured by the base station, to facilitate some services that require high latency, such as Ultra-Reliable and Low Latency Communications (URLLC) services, or services with relatively regular service formats: such as Voice over Internet Protocol (VOIP) services, etc.

In the NR system, the base station can schedule the UL resources or DL resources by way of configured grant of the resources, where the process of data transmission based on a configured grant configuration is as shown in FIG. 1, and a schematic diagram of data transmission based on multiple configured grant configurations on the same Band Width Part (BWP) of the same serving cell is as shown in FIG. 2. The current standard proposes the formulas for calculating the HARQ process IDentity (ID) of each HARQ process respectively for DL and UL.

For DL Transmission:

> HARQ process ID=[floor(CURRENT_slot×10/(the number of slots in a radio frame×periodicity of configured grant configuration))]% the number of HARQ processes of configured grant configuration.

For UL Transmission:

> HARQ process ID=[floor(CURRENT_symbol/periodicity of configured grant configuration)]% the number of HARQ processes of configured grant configuration.

Here, for each HARQ process, the first time to perform data transmission in the current HARQ process of a same group of data packets repeatedly transmitted in the DL is CURRENT_slot=[(SFN×the number of slots in a radio frame)+slot transmission sequence number in a radio frame], and the first time to perform data transmission in the current HARQ process of a same group of data packets repeatedly transmitted in the UL is CURRENT_symbol×(SFN×the number of slots in a radio frame×the number of symbols in a slot+slot transmission sequence number in a radio frame×the number of symbols in a slot+symbol sequence number in a slot), where the number of slots in a radio frame represents the number of consecutive slots in each system frame. For example, when the subcarrier spacing is 15 KHz, a system frame contains 10 slots. The number of symbols in a slot represents the number of consecutive symbols in each slot. For example, in a normal cyclic prefix, there are 14 symbols in a slot. The slot transmission sequence number in a radio frame represents the sequence number of a radio frame slot in the transmission process, such as the $0^{th}$ slot, $1^{st}$ slot, etc. The symbol sequence number in a slot represents the sequence number of a slot symbol in the transmission process, such as the $0^{th}$ symbol, $1^{st}$ symbol. The SFN represents the System Frame Number (SFN) corresponding to a system frame in the transmission process, and the periodicity of the configured grant configuration is the periodicity in which the configured grant configuration occurs, such as 10 ms, etc.

However, as shown in FIG. 4, it is assumed that there are 4 configured grant configurations in the UL, which are Configured Grant configuration 0, Configured Grant configuration 1, Configured Grant configuration 2 and Configured Grant configuration 3 respectively, while the CURRENT_symbols corresponding to the first HARQ processes in the Configured Grant configuration 0, Configured Grant configuration 1, Configured Grant configuration 2 and Configured Grant configuration 3 are 0, 2, 4 and 6 respectively. If the periodicities corresponding to the Configured Grant configuration 0, Configured Grant configuration 1, Configured Grant configuration 2 and Configured Grant configuration 3 are all 20 slots, when the HARQ process ID is calculated by the above formula, there is a need to round down when calculating the floor (CURRENT_symbol/periodicity of configured grant configuration), so the HARQ process IDs of the HARQ processes for the Configured Grant configuration 0, Configured Grant configuration 1, Configured Grant configuration 2 and Configured Grant configuration 3 are 0, 0, 0 and 0 respectively. Therefore, the scenario where the HARQ process IDs of the HARQ processes corresponding to configured grant configurations conflict will occur before the HARQ process receives no feedback or the configured grant timer expires. Therefore, how to solve the collision of HARQ process IDs when performing data transmission based on configured grant configurations in the prior art is a problem worthy of study.

SUMMARY

According to one aspect of the present application, a method for determining an HARQ process ID is provided, which includes:

determining, by a terminal device, a target parameter, where the target parameter is an index number of a configured grant configuration or a time domain offset from an SFN of 0 configured in a configured grant configuration or HARQ process information configured in a configured grant configuration; and determining, by the terminal device, an HARQ process ID of an HARQ process corresponding to the configured grant configuration according to the target parameter.

In one embodiment, when the HARQ process is UL transmission, the determining an HARQ process ID of an HARQ process corresponding to the configured grant configuration according to the target parameter includes:

calculating and determining the HARQ process ID of the HARQ process according to a formula of: HARQ process ID=[floor (current transmission time unit/periodicity of configured grant configuration+index number of configured grant configuration)]% a quantity of HARQ processes of configured grant configuration.

In one embodiment, when the HARQ process is DL transmission, the determining an HARQ process ID of an HARQ process corresponding to the configured grant configuration according to the target parameter includes:

calculating and determining the HARQ process ID of the HARQ process according to a formula of: HARQ process ID=[floor (current transmission time unit×10/(a quantity of slots in a radio frame×periodicity of configured grant configuration)+index number of configured grant configuration)]% a quantity of HARQ processes of configured grant configuration.

In one embodiment, when the HARQ process is UL transmission, the determining an HARQ process ID of an HARQ process corresponding to the configured grant configuration according to the target parameter includes:

calculating and determining the HARQ process ID of the HARQ process according to a formula of: HARQ process ID=[floor (current transmission time unit/periodicity of configured grant configuration+time domain offset)]% a quantity of HARQ processes of configured grant configuration.

In one embodiment, when the HARQ process is DL transmission, the determining an HARQ process ID of an HARQ process corresponding to the configured grant configuration according to the target parameter includes:

calculating and determining the HARQ process ID of the HARQ process according to a formula of: HARQ process ID=[floor (current transmission time unit×10/(a quantity of slots in a radio frame×periodicity of configured grant configuration)+time domain offset)]% a quantity of HARQ processes of configured grant configuration.

In one embodiment, the HARQ process information configured in the configured grant configuration is HARQ process ID information configured by the configured grant configuration or HARQ process quantity information configured by the configured grant configuration.

In one embodiment, the determining an HARQ process ID of an HARQ process corresponding to the configured grant configuration according to the target parameter includes:

when the HARQ process information configured in the configured grant configuration includes one HARQ process ID, determining the HARQ process ID configured by the configured grant configuration as the HARQ process ID of the HARQ process.

In one embodiment, the determining an HARQ process ID of an HARQ process corresponding to the configured grant configuration according to the target parameter further includes:

when the HARQ process information configured in the configured grant configuration includes HARQ process IDs, determining the HARQ process ID of the HARQ process configuration according to the plurality of HARQ process IDs configured by the configured grant configuration.

In one embodiment, when the HARQ process is UL transmission, the determining an HARQ process ID of an HARQ process corresponding to the configured grant configuration according to the target parameter includes:

calculating and determining the HARQ process ID of the HARQ process according to a formula of: HARQ process ID=[floor (current transmission time unit/periodicity of configured grant configuration)]% $M_i$+offset$_i$, where i is an index number of configured grant configuration, $M_i$ is a quantity of HARQ processes configured in an $i^{th}$ configured grant configuration, offset$_0$=0 when i=0, $$offset_i = \sum_{i=0}^{i-1} M_j$$

when i>0, $M_j$ represents a quantity of HARQ processes configured in a $j^{th}$ configured grant configuration.

In one embodiment, when the HARQ process is DL transmission, the determining an HARQ process ID of an HARQ process corresponding to the configured grant configuration according to the target parameter includes:

calculating and determining the HARQ process ID of the HARQ process according to a formula of: HARQ process ID=[floor (current transmission time unit×10/(a quantity of slots in a radio frame×periodicity of configured grant configuration))]% $M^i$+offset$_i$, where i is an index number of configured grant configuration, $M_i$ is a quantity of HARQ processes configured in an $i^{th}$ configured grant configuration, offset$_0$=0 when i=0, $$offset_i = \sum_{i=0}^{i-1} M_j$$

when i>0, $M_j$ represents a quantity of HARQ processes configured in a $j^{th}$ configured grant configuration.

According to another embodiment of the present application, an apparatus for determining an HARQ process ID is further provided, which includes:

a first determining device configured to determine a target parameter, where the target parameter is an index number of a configured grant configuration or a time domain offset from a system frame number of 0 configured in a configured grant configuration or HARQ process information configured in a configured grant configuration; and a second determining device configured to determine an HARQ process ID of an HARQ process corresponding to the configured grant configuration according to the target parameter.

In one embodiment, the second determining device is further configured to: calculate and determine the HARQ process ID of the HARQ process according to a formula of: HARQ process ID=[floor (current transmission time unit/periodicity of configured grant configuration+index number of configured grant configuration)]% a quantity of HARQ processes of configured grant configuration when the HARQ process is UL transmission.

In one embodiment, the second determining device is further configured to: calculate and determine the HARQ process ID of the HARQ process according to a formula of: HARQ process ID=[floor (current transmission time unit× 10/(a quantity of slots in a radio frame×periodicity of configured grant configuration)+index number of configured grant configuration)]% a quantity of HARQ processes of configured grant configuration when the HARQ process is DL transmission.

In one embodiment, the second determining device is further configured to: calculate and determine the HARQ process ID of the HARQ process according to a formula of: HARQ process ID=[floor (current transmission time unit/ periodicity of configured grant configuration+time domain offset)]% a quantity of HARQ processes of configured grant configuration when the HARQ process is UL transmission.

In one embodiment, the second determining device is further configured to: calculate and determine the HARQ process ID of the HARQ process according to a formula of: HARQ process ID=[floor (current transmission time unit× 10/(a quantity of slots in a radio frame×periodicity of configured grant configuration)+time domain offset)]% a quantity of HARQ processes of configured grant configuration when the HARQ process is DL transmission.

In one embodiment, the HARQ process information configured in the configured grant configuration is HARQ process ID information configured by the configured grant configuration or HARQ process quantity information configured by the configured grant configuration, and the second determining device is further configured to: when the HARQ process information configured in the configured grant configuration includes one HARQ process ID, determine the HARQ process ID configured by the configured grant configuration as the HARQ process ID of the HARQ process.

In one embodiment, the second determining device is further configured to: when the HARQ process information configured in the configured grant configuration includes HARQ process IDs, determine the HARQ process ID of the HARQ process according to the plurality of HARQ process IDs configured by the configured grant configuration.

In one embodiment, the second determining device is further configured to: calculate and determine the HARQ process ID of the HARQ process according to a formula of: HARQ process ID=[floor (current transmission time unit/periodicity of configured grant configuration)]% $M_i$+$offset_i$ when the HARQ process is UL transmission, where i is an index number of configured grant configuration, $M_i$ is a quantity of HARQ processes configured in an $i^{th}$ configured grant configuration, $offset_0$=0 when i=0, $$offset_i = \sum_{i=0}^{i-1} M_j$$

when i>0, $M_j$ represents a quantity of HARQ processes configured in a $j^{th}$ configured grant configuration.

In one embodiment, the second determining device is further configured to: calculate and determine the HARQ process ID of the HARQ process according to a formula of: HARQ process ID=[floor (current transmission time unit× 10/(a quantity of slots in a radio frame×periodicity of configured grant configuration))]% $M_i$+$offset_i$ when the HARQ process is DL transmission, where i is an index number of configured grant configuration, $M_i$ is a quantity of HARQ processes configured in an $i^{th}$ configured grant configuration, $offset_0$=0 when i=0, $$offset_i = \sum_{i=0}^{i-1} M_j$$

when i>0, $M_j$ represents a quantity of HARQ processes configured in a $j^{th}$ configured grant configuration.

According to another embodiment of the present application, there is also provided a terminal, which includes: a processor and a memory;

the processor is configured to read a program in the memory to perform the process of:

determining a target parameter, where the target parameter is an index number of a configured grant configuration or a time domain offset from a system frame number of 0 configured in a configured grant configuration or HARQ process information configured in a configured grant configuration; and determining an HARQ process ID of an HARQ process corresponding to the configured grant configuration according to the target parameter.

In one embodiment, the processor is further configured to: calculate and determine the HARQ process ID of the HARQ process according to a formula of: HARQ process ID=[floor (current transmission time unit/periodicity of configured grant configuration+index number of configured grant configuration)]% a quantity of HARQ processes of configured grant configuration when the HARQ process is UL transmission.

In one embodiment, the processor is further configured to: calculate and determine the HARQ process ID of the HARQ process according to a formula of: HARQ process ID=[floor (current transmission time unit×10/(a quantity of slots in a radio frame×periodicity of configured grant configuration)+index number of configured grant configuration)]% a quantity of HARQ processes of configured grant configuration when the HARQ process is DL transmission.

In one embodiment, the processor is further configured to: calculate and determine the HARQ process ID of the HARQ process according to a formula of: HARQ process ID=[floor (current transmission time unit/periodicity of configured grant configuration+time domain offset)]% a quantity of HARQ processes of configured grant configuration when the HARQ process is UL transmission.

In one embodiment, the processor is further configured to: calculate and determine the HARQ process ID of the HARQ process according to a formula of: HARQ process ID=[floor (current transmission time unit×10/(a quantity of slots in a radio frame×periodicity of configured grant configuration)+time domain offset)]% a quantity of HARQ processes of configured grant configuration when the HARQ process is DL transmission.

In one embodiment, the HARQ process information configured in the configured grant configuration is HARQ process ID information configured by the configured grant configuration or HARQ process quantity information configured by the configured grant configuration, and the processor is further configured to: when the HARQ process information configured in the configured grant configuration includes one HARQ process ID, determine the HARQ process ID configured by the configured grant configuration as the HARQ process ID of the HARQ process.

In one embodiment, the processor is further configured to: when the HARQ process information configured in the configured grant configuration includes HARQ process IDs, determine the HARQ process ID of the HARQ process according to the plurality of HARQ process IDs configured by the configured grant configuration.

In one embodiment, the processor is further configured to: calculate and determine the HARQ process ID of the HARQ process according to a formula of: HARQ process ID=[floor (current transmission time unit/periodicity of configured grant configuration)]% $M_i$+$offset_i$ when the HARQ process is UL transmission, where i is an index number of configured grant configuration, $M_i$ is a quantity of HARQ processes configured in an $i^{th}$ configured grant configuration, $offset_0$=0 when i=0, $$offset_i = \sum_{i=0}^{i-1} M_j$$

when i>0, $M_j$ represents a quantity of HARQ processes configured in a $j^{th}$ configured grant configuration.

In one embodiment, the processor is further configured to: calculate and determine the HARQ process ID of the HARQ process according to a formula of: HARQ process ID=[floor (current transmission time unit×10/(a quantity of slots in a radio frame×periodicity configured grant configuration))]% $M_i$+offset$_i$ when the HARQ process is DL transmission, where i is an index number of configured grant configuration, $M_i$ is a quantity of HARQ processes configured in an $i^{th}$ configured grant configuration, offset$_0$=0 when i=0, $$\text{offset}_i = \sum_{j=0}^{i-1} M_j$$

when i>0, $M_j$ represents a quantity of HARQ processes configured in a $j^{th}$ configured grant configuration.

According to another embodiment of the present application, there is also provided a computer readable storage medium, which stores a computer program executable by an electronic device. When the program runs on the electronic device, the electronic device performs the steps in the above method for determining the HARQ process ID.

According to another embodiment of the present application, there is also provided a computer program product. When the instructions in the computer program product run on an electronic device, the electronic device can perform the steps in the above method for determining the HARQ process ID. The above-mentioned electronic device may be a sending device or a receiving device.

BRIEF DESCRIPTION OF THE DRAWINGS

The embodiments of the present application are illustrated more clearly, the accompanying figures which need to be used in describing the embodiments or the prior art will be introduced below briefly.

DETAILED DESCRIPTION OF THE EMBODIMENTS

Figure 1:
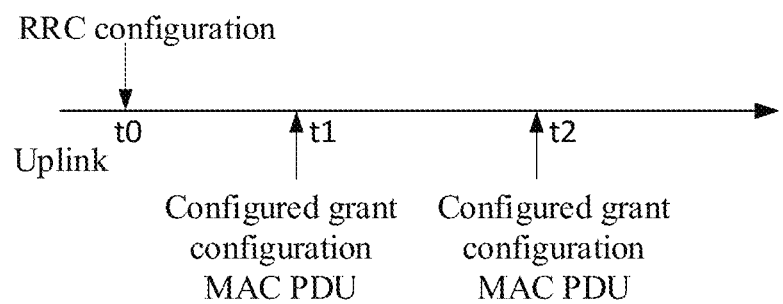
FIG. 1 is a schematic diagram of data transmission based on a configured grant configuration.
Figure 2:
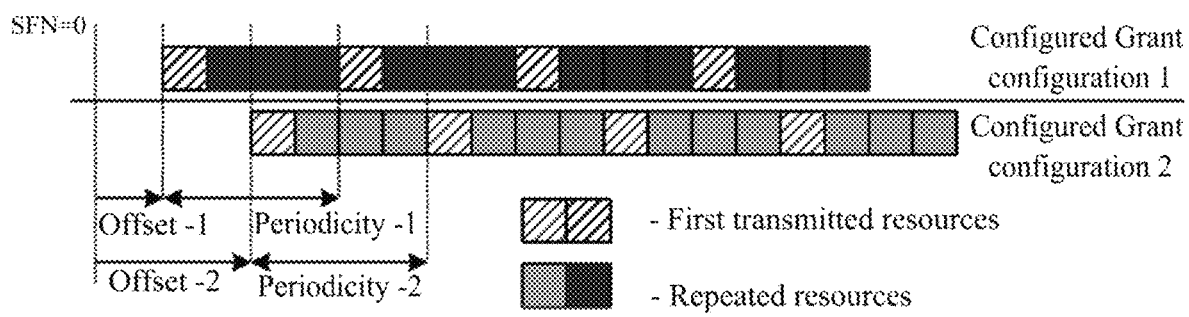
FIG. 2 is a schematic diagram of data transmission based on configured grant configurations.

Embodiments of the present application will be further illustrated below in details with reference to the accompanying drawings. The described embodiments are merely a part of the embodiments of the present application but not all the embodiments.

The embodiments of the present application will be described clearly and completely below in combination with the accompanying drawings in the embodiments of the present application. Obviously, the described embodiments are only a part of the embodiments of the present application but not all the embodiments.

The basic definitions involved in the embodiments of the present application are explained here, and will not be repeated later. The number of slots in a radio frame represents the number of consecutive slots in each system frame, for example, when the subcarrier spacing is 15 KHz, a system frame contains 10 slots. The number of symbols in a slot represents the number of consecutive symbols in each slot, for example, in a normal cyclic prefix, there are 14 symbols in a slot. The slot transmission sequence number in a radio frame represents the sequence number of a radio frame slot in the transmission process, such as the $0^{th}$ slot, $1^{st}$ slot, etc. The symbol sequence number in a slot represents the sequence number of a slot symbol in the transmission process, such as the $0^{th}$ symbol, $1^{st}$ symbol. The SFN represents the system frame number corresponding to a system frame in the transmission process. The periodicity of configured grant configuration is the periodicity in which the configured grant configuration occurs, such as 10 ms, etc. The current transmission time unit is the first transmission time of the repeated data transmission when the transmission of the current configured grant configuration is repeated transmission, and may be the current slot or current symbol, or may be determined according to the CURRENT_symbol in the formula for determining the HARQ process ID in the prior art. The number of HARQ processes of configured grant configuration is the number of HARQ processes reserved in the configured grant configuration, for example, the network side reserves 8 HARQ processes for the configured grant configuration, which can be represented as the number of DL HARQ processes reserved in the configured grant configuration or the number of UL HARQ processes reserved in the configured grant configuration.

In the present application, the terminal device includes a device for providing the voice and/or data connectivity to users, for example, may include a handheld device with the wireless connection function, or a processing device connected to a wireless modem. The terminal device may communicate with the core network via the Radio Access Network (RAN), and exchange the voice and/or data with the RAN. The terminal device may include User Equipment (UE), wireless terminal device, mobile terminal device, subscriber unit, subscriber station, mobile station, mobile, remote station, Access Point (AP), remote terminal, access terminal, user terminal, user agent, or user device, etc. For example, it may include a mobile phone (or called "cellular" phone): a computer with a mobile terminal device: a portable, pocket, handheld, computer built-in or vehicle-carried mobile device; a smart wearable device or the like, for example, Personal Communication Service (PCS) telephone, cordless telephone, Session Initiation Protocol (SIP) telephone, Wireless Local Loop (WLL) station, Personal Digital Assistant (PDA) and other devices. It also includes limited devices, e.g., device with lower power consumption, device with limited storage capability, or device with limited computing capability or the like, e.g., includes bar code, Radio Frequency Identification (RFID) sensor, Global Positioning System (GPS), laser scanner and other information sensing devices. In the present application, the network device may be a base station, which may be a commonly-used base station, or an evolved Node Base station (eNB), or a network device (for example, next generation node base station (gNB) or Transmission and Reception Point (TRP)) in the 5G system, etc.

In the present application, the Media Access Control Packet Data Unit (MAC PDU) is composed of character strings arranged in bytes. The MAC PDU includes the following types of MAC PDUs used for data transmission: MAC PDU in the transparent transmission process, and MAC PDU in the random access response process. The MAC PDU used for data transmission is, for example, Downlink Share Channel (DL-SCH) or Uplink Share Channel (UL-SCH).

Different types of MAC PDUs have different structures and contain different information. The structure of the MAC PDU used for data transmission can include an MAC header, zero or more Media Access Control Service Data Units (MAC SDUs), zero or more Media Access Control Control Elements (MAC CEs), and padding information (padding). The MAC PDU in the transparent transmission process has no MAC header and only includes the MAC SDU. The structure of the MAC PDU in the random access response process may include an MAC header, zero or more MAC SDUs, zero or more Media Access Control Random Access Responses (MAC RARs), and padding. Each transport block of the UE can only carry one MAC PDU.

In the present application, for the Hybrid Automatic Repeat reQuest (HARQ) entity, each terminal device corresponds to one HARQ entity, and one HARQ entity includes HARQ processes. Each HARQ process corresponds to a unique HARQ process Identification (ID), while each HARQ process saves a New Data Indicator (NDI) that is used to indicate that the scheduled data belongs to new transmission or retransmission.

In the present application, configured grant configurations can be divided into Configured Grant Type1 and Configured Grant Type2. The Configured Grant Type1 is Radio Resource Control (RRC) configuration resource location, Modulation Coding Scheme (MCS), Resource Block (RB) size, the number of Hybrid Automatic Repeat reQuests (HARQs), periodicity and other content, and takes effect after the RRC configuration without needing the physical layer activation and deactivation processes. The Configured Grant Type2 is also the RRC configuration resource location, the number of HARQs and periodicity but does not configure the RB and MCS mode, and requires the physical layer to send the Downlink Control Information (DCI) to activate and deactivate resources.

Figure 3:
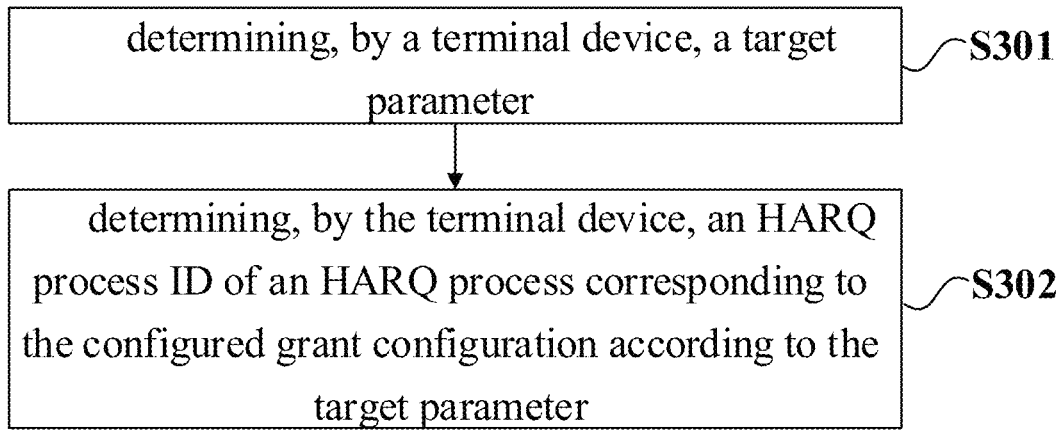
FIG. 3 is a flowchart of a method for determining an HARQ process ID provided by an embodiment of the present application.

When there are configured grant configurations and when the HARQ process ID is calculated based on the formula for calculating the HARQ process ID in the prior art, the scenario where the HARQ process IDs of the HARQ processes corresponding to configured grant configurations conflict will occur before the HARQ process receives no feedback or the configured grant timer expires. An embodiment of the present application provides a method for determining an HARQ process ID. As shown in FIG. 3, the method includes the following steps.

Step S301: determining, by a terminal device, a target parameter.

In the embodiment of the present application, the target parameter is an index number of a configured grant configuration or a time domain offset from a system frame number of 0 configured in a configured grant configuration or HARQ process information configured in a configured grant configuration.

Step S302: determining, by the terminal device, an HARQ process ID of an HARQ process corresponding to the configured grant configuration according to the target parameter.

That is to say, in the embodiment of the present application, when determining the HARQ process ID of the HARQ process corresponding to the configured grant configuration, it can be determined according to the index number of the configured grant configuration, or determined according to the time domain offset configured in the configured grant configuration, or determined according to the HARQ process information configured in the configured grant configuration. It should be noted that the target parameter selected when determining the HARQ process ID is not specifically limited in the embodiments of the present application, that is to say, the target parameter is not merely limited to the three parameters described above, and other parameter related to the configured grant configuration can also be used as the target parameter selected when determining the HARQ process ID.

Here, when the HARQ process ID is determined by the target parameter, the target parameter can be combined with the formula for determining the HARQ process ID in the prior art to jointly determine the HARQ process ID, or the HARQ process ID can be directly determined according to the target parameter. The way to determine the HARQ process ID is not specifically limited in the embodiments of the present application.

In some embodiments of the present application, the index number of the configured grant configuration, the time domain offset configured in the configured grant configuration or the HARQ process information configured in the configured grant configuration introduced in the process of determining the HARQ process ID of the HARQ process corresponds to a different value, so it can be ensured that the HARQ process IDs of HARQ processes corresponding to configured grant configurations are different values regardless of whether the HARQ process ID is determined in combination with the formula for determining the HARQ process ID in the prior art or the HARQ process ID is directly determined according to the target parameter, to solve the problem of collision of HARQ process IDs corresponding to configured grant configurations before the HARQ process receives no feedback or the configured grant timer expires.

In one embodiment, the base station can schedule UL resources or DL resources by way of configured grant of the resources, so in an embodiment of the present application, when the HARQ process is UL transmission, the step of determining the HARQ process ID of the HARQ process corresponding to the configured grant configuration according to the target parameter includes:

calculating the HARQ process ID of the HARQ process according to a formula of: HARQ process ID=[floor (current transmission time unit/periodicity of configured grant configuration+index number of configured grant configuration)]% the number of HARQ processes of configured grant configuration.

Here, it should be noted that, in the embodiment of the present application, the index number of configured grant configuration represents the identification number or serial number of the current configured grant configuration. For example, the Configured Grant configuration 1 represents the first configured grant configuration, the Configured Grant configuration 2 represents the second configured grant configuration, and so on.

As can be seen from the above formula, in the embodiment of the present application, the target parameter is the index number of configured grant configuration. Compared with the formula for determining the HARQ process ID in UL transmission in the prior art, the index number of configured grant configuration is added in the rounding-down process, and each configured grant configuration has a different index number, so the values obtained by rounding down are also different. Therefore, after the number of HARQ processes of the configured grant configuration is modulo, the obtained HARQ process IDs are also different.

Figure 4:
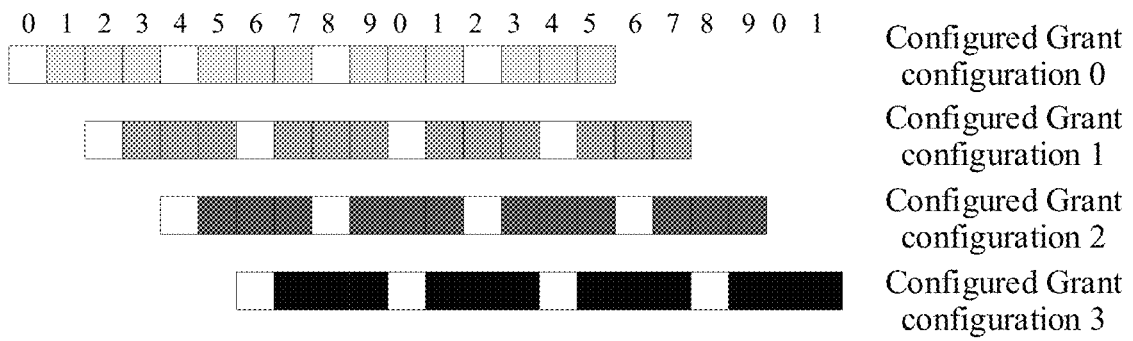
FIG. 4 is a schematic diagram of determining the HARQ process ID according to the index number of the configured grant configuration provided by an embodiment of the present application.

Taking four configured grant configurations shown in FIG. 4 as an example, the squares with different gray levels in the figure represent different resource locations configured. It is assumed that there are 4 configured grant configurations in the UL, which are Configured Grant configuration 0, Configured Grant configuration 1, Configured Grant configuration 2 and Configured Grant configuration 3 respectively: the current transmission time units corresponding to the first HARQ processes in the Configured Grant configuration 0, Configured Grant configuration 1, Configured Grant configuration 2 and Configured Grant configuration 3 are 0, 2, 4 and 6 respectively; and the periodicities of the configured grant configuration are all 20 slots. If the index numbers defined for the Configured Grant configuration 0, Configured Grant configuration 1, Configured Grant configuration 2 and Configured Grant configuration 3 are 0, 1, 2 and 3 respectively, they are substituted into the formula provided in the embodiment of the present application, to calculate the HARQ process IDs corresponding to the Configured Grant configuration 0, Configured Grant configuration 1, Configured Grant configuration 2 and Configured Grant configuration 3 as 0, 1, 2 and 3 respectively. Here, it should be noted that the index number defined for each configured grant configuration is not specifically limited.

Therefore, as can be seen from the above, a different index number is defined for each configured grant configuration when performing configured grant configurations at the network side, and different HARQ process IDs can be calculated and obtained according to the formula of: HARQ process ID=[floor (current transmission time unit/periodicity of configured grant configuration+index number of configured grant configuration)]% the number of HARQ processes of configured grant configuration, so that the HARQ process IDs of HARQ processes corresponding to configured grant configurations are different values, solving the problem of collision of HARQ process IDs corresponding to configured grant configurations before the HARQ process receives no feedback or the configured grant timer expires in the prior art.

Here, it should be noted that, when the target parameter is the index number of configured grant configuration, HARQ process ID=[floor (current transmission time unit/periodicity of configured grant configuration)+index number of configured grant configuration]% the number of HARQ processes of configured grant configuration may be used as the extension of HARQ process ID=[floor (current transmission time unit/periodicity of configured grant configuration+index number of configured grant configuration)]% the number of HARQ processes of configured grant configuration in UL transmission. That is to say, the current transmission time unit/periodicity of configured grant configuration is rounded down, and then added with the index number of configured grant configuration, and then a modulus operation is performed for the number of HARQ processes of configured grant configuration. In such calculation, the values of the HARQ process IDs obtained by the calculation can also be different. Therefore, the variant formula obtained according to HARQ process ID=[floor (current transmission time unit/periodicity of configured grant configuration+index number of configured grant configuration)]% the number of HARQ processes of configured grant configuration in the embodiment of the present application is also within the protection scope of the embodiments of the present application.

On the basis of the foregoing embodiments, in an embodiment of the present application, if the target parameter is an index number of configured grant configuration and the HARQ is DL transmission, the step of determining the HARQ process ID of the HARQ process corresponding to the configured grant configuration according to the target parameter includes:

calculating and determining the HARQ process ID of the HARQ process according to a formula of: HARQ process ID=[floor (current transmission time unit×10/ (the number of slots in a radio frame×periodicity of configured grant configuration)+index number of configured grant configuration)]% the number of HARQ processes of configured grant configuration.

As can be seen from the above formula, in the embodiment of the present application, compared with the formula for determining the HARQ process ID in DL transmission in the prior art, in the embodiment of the present application, the index number of configured grant configuration is also added in the rounding-down process, where each configured grant configuration has a different index number, so the values obtained by rounding down are also different. Therefore, when the number of HARQ processes of the configured grant configuration is modulo, the obtained HARQ process IDs are also different.

Still taking 4 configured grant configurations shown in FIG. 4 as an example, it is assumed that there are 4 configured grant configurations in the DL, which are Configured Grant configuration 0, Configured Grant configuration 1, Configured Grant configuration 2 and Configured Grant configuration 3 respectively, and the current transmission time units corresponding to the first HARQ processes in the Configured Grant configuration 0, Configured Grant configuration 1, Configured Grant configuration 2 and Configured Grant configuration 3 are 0, 2, 4 and 6 respectively. If the index numbers defined for the Configured Grant configuration 0, Configured Grant configuration 1, Configured Grant configuration 2 and Configured Grant configuration 3 are 0, 1, 2 and 3 respectively, they are substituted into the formula provided in the embodiment of the present application, to calculate the HARQ process IDs corresponding to the Configured Grant configuration 0, Configured Grant configuration 1, Configured Grant configuration 2 and Configured Grant configuration 3 as 0, 1, 2 and 3 respectively. Here, it should be noted that the index number configured in each configured grant configuration is not specifically limited to 0, 1, 2, or 3 in this embodiment.

Therefore, as can be seen from the above, a different index number is defined for each configured grant configuration when performing configured grant configurations at the network side, and different HARQ process IDs can be calculated and obtained according to the formula of: HARQ process ID=[floor (current transmission time unit×10/(the number of slots in a radio frame×periodicity of configured grant configuration)+index number of configured grant configuration)]% the number of HARQ processes of configured grant configuration, so that the HARQ process IDs of HARQ processes corresponding to configured grant configurations are different values, solving the problem of collision of HARQ process IDs corresponding to configured grant configurations before the HARQ process receives no feedback or the configured grant timer expires in the prior art.

Here, it should be noted that, when the target parameter is the index number of configured grant configuration, HARQ process ID=[floor (current transmission time unit×10/(the number of slots in a radio frame×periodicity of configured grant configuration))+index number of configured grant configuration]% the number of HARQ processes of configured grant configuration may be used as the extension of HARQ process ID=[floor (current transmission time unit× 10/(the number of slots in a radio frame×periodicity of configured grant configuration)+index number of configured grant configuration)]% the number of HARQ processes of configured grant configuration in DL transmission. That is to say, the current transmission time unit×10/(the number of slots in a radio frame×periodicity of configured grant configuration) is rounded down, and then added with the index number of configured grant configuration, and then a modulus operation is performed for the number of HARQ processes of configured grant configuration. In such calculation, the values of the HARQ process IDs obtained by the calculation can also be different. Therefore, the variant formula obtained according to HARQ process ID=[floor (current transmission time unit×10/(the number of slots in a radio frame×periodicity of configured grant configuration)+ index number of configured grant configuration)]% the number of HARQ processes of configured grant configuration in the embodiment of the present application is also within the protection scope of the embodiments of the present application.

On the basis of the foregoing embodiments, in an embodiment of the present application, if the HARQ process is UL transmission, the step of determining the HARQ process ID of the HARQ process corresponding to the configured grant configuration according to the target parameter includes:

calculating and determining the HARQ process ID of the HARQ process according to a formula of: HARQ process ID=[floor (current transmission time unit/periodicity of configured grant configuration+time domain offset)]% the number of HARQ processes of configured grant configuration.

As can be seen from the above formula, in the embodiment of the present application, the target parameter is the time domain offset. Compared with the formula for determining the HARQ process ID in UL transmission in the prior art, the time domain offset is added in the rounding-down process. When the time domain offsets configured in configured grant configurations are different, the values obtained by rounding down the current transmission time unit/periodicity of configured grant configuration+time domain offset are also different. Therefore, when the number of HARQ processes of the configured grant configuration is modulo, the obtained HARQ process IDs are also different.

Figure 5:
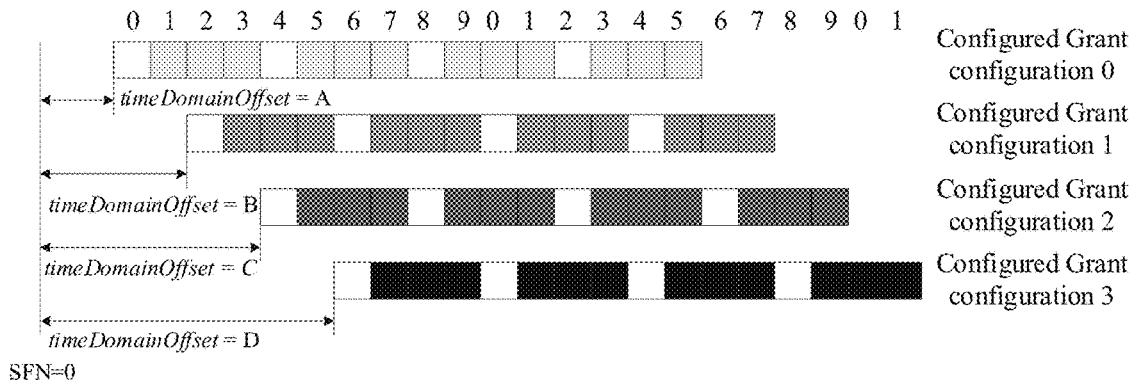
FIG. 5 is a schematic diagram of determining the HARQ process ID according to the time domain offset provided by an embodiment of the present application.

Taking 4 configured grant configurations shown in FIG. 5 as an example, it is assumed that there are 4 configured grant configurations in the UL, which are Configured Grant configuration 0, Configured Grant configuration 1, Configured Grant configuration 2 and Configured Grant configuration 3 respectively, and the current transmission time units corresponding to the first HARQ processes in the Configured Grant configuration 0, Configured Grant configuration 1, Configured Grant configuration 2 and Configured Grant configuration 3 are 0, 2, 4 and 6 respectively. If the time domain offset of the Configured Grant configuration 0 is 1, the time domain offset of the Configured Grant configuration 1 is 2, the time domain offset of the Configured Grant configuration 2 is 3, and the time domain offset of the Configured Grant configuration 3 is 4, they are substituted into the formula provided in the embodiment of the present application, to calculate the HARQ process IDs corresponding to the Configured Grant configuration 0, Configured Grant configuration 1, Configured Grant configuration 2 and Configured Grant configuration 3 as 0, 1, 2 and 3 respectively. Here, it should be noted that the time domain offset configured in each configured grant configuration is not specifically limited to 1, 2, 3, or 4 in this embodiment.

Therefore, as can be seen from the above, if a different time domain offset is configured in each configured grant configuration when performing configured grant configurations at the network side, different HARQ process IDs can be calculated and obtained according to the formula of: HARQ process ID=[floor (current transmission time unit/periodicity of configured grant configuration+time domain offset)]% the number of HARQ processes of configured grant configuration, so that the HARQ process IDs of HARQ processes corresponding to configured grant configurations are different values, solving the problem of collision of HARQ process IDs corresponding to configured grant configurations before the HARQ process receives no feedback or the configured grant timer expires in the prior art.

Here, it should be noted that, when the target parameter is the time domain offset configured in the configured grant configuration, HARQ process ID=[floor (current transmission time unit/periodicity of configured grant configuration)+time domain offset]% the number of HARQ processes of configured grant configuration may be used as the extension of HARQ process ID=[floor (current transmission time unit/periodicity of configured grant configuration+time domain offset)]% the number of HARQ processes of configured grant configuration in UL transmission. That is to say, the current transmission time unit/periodicity of configured grant configuration is rounded down, and then added with the time domain offset configured in the configured grant configuration, and then a modulus operation is performed for the number of HARQ processes of configured grant configuration. In such calculation, the values of the HARQ process IDs obtained by the calculation can also be different. Therefore, the variant formula obtained according to HARQ process ID=[floor (current transmission time unit/periodicity of configured grant configuration+time domain offset)]% the number of HARQ processes of configured grant configuration in the embodiment of the present application is also within the protection scope of the embodiments of the present application.

On the basis of the foregoing embodiments, in an embodiment of the present application, if the HARQ process is DL transmission, the step of determining the HARQ process ID of the HARQ process corresponding to the configured grant configuration according to the target parameter includes:

calculating and determining the HARQ process ID of the HARQ process according to a formula of: HARQ process ID=[floor (current transmission time unit×10/ (the number of slots in a radio frame×periodicity of configured grant configuration)+time domain offset)]% the number of HARQ processes of configured grant configuration.

As can be seen from the above formula, in the embodiment of the present application, the target parameter is the time domain offset. Compared with the formula for determining the HARQ process ID in UL transmission in the prior art, the time domain offset is added in the rounding-down process. When the time domain offsets configured in configured grant configurations are different, the values obtained by rounding down the current transmission time unit×10/(the number of slots in a radio frame×periodicity of configured grant configuration)+time domain offset are also different. Therefore, when the number of HARQ processes of the configured grant configuration is modulo, the obtained HARQ process IDs are also different.

Still taking 4 configured grant configurations shown in FIG. 5 as an example, it is assumed that there are 4 configured grant configurations in the DL, which are Configured Grant configuration 0, Configured Grant configuration 1, Configured Grant configuration 2 and Configured Grant configuration 3 respectively, and the current transmission time units corresponding to the first HARQ processes in the Configured Grant configuration 0, Configured Grant configuration 1, Configured Grant configuration 2 and Configured Grant configuration 3 are 0, 2, 4 and 6 respectively. If the time domain offset of the Configured Grant configuration 0 is 1, the time domain offset of the Configured Grant configuration 1 is 2, the time domain offset of the Configured Grant configuration 2 is 3, and the time domain offset of the Configured Grant configuration 3 is 4, they are substituted into the formula provided in the embodiment of the present application, to calculate the HARQ process IDs corresponding to the Configured Grant configuration 0, Configured Grant configuration 1, Configured Grant configuration 2 and Configured Grant configuration 3 as 0, 1, 2 and 3 respectively. Here, it should be noted that the time domain offset configured in each configured grant configuration is not specifically limited to 1, 2, 3, or 4 in this embodiment.

Therefore, as can be seen from the above, if a different time domain offset is configured in each configured grant configuration when performing configured grant configurations at the network side, different HARQ process IDs can be calculated and obtained according to the formula of: HARQ process ID=[floor (current transmission time unit× 10/(the number of slots in a radio frame×periodicity of configured grant configuration)+time domain offset)]% the number of HARQ processes of configured grant configuration, so that the HARQ process IDs of HARQ processes corresponding to configured grant configurations are different values, solving the problem of collision of HARQ process IDs corresponding to configured grant configurations before the HARQ process receives no feedback or the configured grant timer expires in the prior art.

Here, it should be noted that, when the target parameter is the time domain offset configured in the configured grant, HARQ process ID=[floor (current transmission time unit× 10/(the number of slots in a radio frame×periodicity of configured grant configuration))+time domain offset]% the number of HARQ processes of configured grant configuration may be used as the extension of HARQ process ID= [floor (current transmission time unit×10/(the number of slots in a radio frame×periodicity of configured grant configuration)+time domain offset)]% the number of HARQ processes of configured grant configuration in DL transmission. That is to say, the current transmission time unit×10/ (the number of slots in a radio frame×periodicity of configured grant configuration) is rounded down, and then added with the time domain offset configured in the configured grant configuration, and then a modulus operation is performed for the number of HARQ processes of configured grant configuration. In such calculation, the values of the HARQ process IDs obtained by the calculation can also be different. Therefore, the variant formula obtained according to HARQ process ID=[floor (current transmission time unit×10/(the number of slots in a radio frame×periodicity of configured grant configuration)+time domain offset)]% the number of HARQ processes of configured grant configuration in the embodiment of the present application is also within the protection scope of the embodiments of the present application.

Here, it should be noted that, when the target parameter is the index number of configured grant configuration or the time domain offset, if a formula with the index number of configured grant configuration or the time domain offset as an input parameter as an extension, it is also possible to calculate the HARQ process ID based on the above formula or extended formula, which is also within the protection scope of the present application.

Since the HARQ process information configured in the configured grant configuration may be the HARQ process ID information configured by the configured grant configuration, on the basis of the foregoing embodiments, in an embodiment of the present application, the step of determining the HARQ process ID of the HARQ process corresponding to the configured grant configuration according to the target parameter includes:

if the HARQ process information configured in the configured grant configuration includes one HARQ process ID, determining the HARQ process ID configured by the configured grant configuration as the HARQ process ID of each HARQ process.

For a configured grant configuration, if the HARQ process ID of this configured grant configuration has been configured at the network side and this HARQ process ID is a numerical value, then the HARQ process IDs in this configured grant configuration are all this numerical value.

Figure 6:
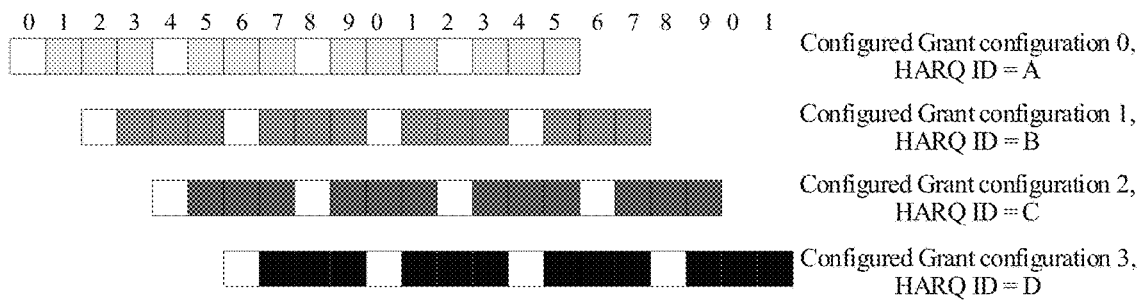
FIG. 6 is a schematic diagram of determining the HARQ process ID according to the configured HARQ process information provided by an embodiment of the present application.

Taking 4 configured grant configurations shown in FIG. 6 as an example, it is assumed that the HARQ process IDs configured for the Configured Grant configuration 0, Configured Grant configuration 1, Configured Grant configuration 2 and Configured Grant configuration 3 are A, B, C and D respectively, then the HARQ process IDs of the HARQ processes in each periodicity of the Configured Grant configuration 0 are all A, the HARQ process IDs of the HARQ processes in each periodicity of the Configured Grant configuration 1 are all B, the HARQ process IDs of the HARQ processes in each periodicity of the Configured Grant configuration 2 are all C, and the HARQ process IDs of the HARQ processes in each periodicity of the Configured Grant configuration 3 are all D. Since A, B, C and D are different values, there will be no case of repeated HARQ process IDs for each periodicity of the configured grant configuration. Thus, the problem of collision of the HARQ process IDs in the prior art can be solved.

Here, if the HARQ process information configured in the configured grant configuration includes HARQ process IDs, the HARQ process ID of the HARQ process is determined according to the plurality of HARQ process IDs configured by the configured grant configuration.

In one embodiment, when HARQ process IDs of the configured grant configuration are configured at the network side, the UE can arbitrarily select from the plurality of HARQ process IDs. Since each HARQ process ID is a different value, the problem of collision of the HARQ process IDs can also be avoided.

Therefore, as can be seen from the above, a different HARQ process ID is configured for each configured grant configuration when performing configured grant configurations at the network side, so that the HARQ process IDs of HARQ processes corresponding to configured grant configurations can be different values, solving the problem of collision of HARQ process IDs corresponding to configured grant configurations before the HARQ process receives no feedback or the configured grant timer expires in the prior art.

Since the HARQ process information configured in the configured grant configuration may also be the HARQ process quantity information configured by the configured grant configuration, on the basis of the foregoing embodiments, in an embodiment of the present application, the step of determining the HARQ process ID of the HARQ process corresponding to the configured grant configuration according to the target parameter includes:

calculating and determining the HARQ process ID of the HARQ process according to a formula of: HARQ process ID=[floor (current transmission time unit/periodicity of configured grant configuration)]% $M_i$+offset$_i$, where i is the index number of configured grant configuration, $M_i$ is the number of HARQ processes configured in the $i^{th}$ configured grant configuration, offset$_0$=0 when i=0, $$\text{offset}_i = \sum_{j=0}^{i-1} M_j$$

when i>0, where $M_j$ represents the number of HARQ processes configured in the $j^{th}$ configured grant configuration.

Still taking 4 configured grant configurations shown in FIG. 6 as an example, it is assumed that the HARQ process IDs configured for the Configured Grant configuration 0, Configured Grant configuration 1, Configured Grant configuration 2 and Configured Grant configuration 3 are A, B, C and D respectively, where A, B, C and D respectively represent a set of HARQ process IDs configured for the Configured Grant configuration 0, Configured Grant configuration 1, Configured Grant configuration 2 and Configured Grant configuration 3. It is assumed that the number of HARQ processes configured on the Configured Grant configuration 0 is 2, i.e., $M_0$=2; the number of HARQ process IDs configured on the Configured Grant configuration 1 is 3; the number of HARQ process IDs configured on the Configured Grant configuration 2 is 2; and the number of HARQ process IDs configured on the Configured Grant configuration 3 is 2. When selecting from HARQ process IDs configured for the Configured Grant configuration 0 through the formula, it is assumed that the index number of the Configured Grant configuration 0 is 0, and the CURRENT_symbol corresponding to the first HARQ process of the Configured Grant configuration 0 is 0, that is, the current transmission time unit is 0, and the periodicity of the configured grant configuration is 20 slots, then offset$_0$=0, and the set of values of the HARQ process ID of the Configured Grant configuration 0 is (0, 1) according to the formula: for the Configured Grant configuration 1, the index number is 1, offset$_1$=2, then the set of values of the HARQ process ID is (2, 3, 4); and so on, the set of values of the HARQ process ID on the Configured Grant configuration 2 is (5, 6); the set of values of the HARQ process ID on the Configured Grant configuration 3 is (7, 8). According to the above formula, the HARQ process IDs corresponding to other configured grant configurations can also be calculated.

As can be seen from the above, the HARQ process ID corresponding to each configured grant configuration can also be calculated according to the number of HARQ processes configured by the network side for each configured grant configuration, and the HARQ process IDs calculated for each configured grant configuration are all different values, so the terminal device can arbitrarily select according to different values obtained by calculation, also solving the problem of collision of HARQ process IDs in the prior art.

On the basis of the foregoing embodiments, in an embodiment of the present application, if the HARQ process is DL transmission, the step of determining the HARQ process ID of the HARQ process according to the plurality of HARQ process IDs configured by the configured grant configuration includes:

calculating and determining the HARQ process ID of the HARQ process according to a formula of: HARQ process ID=[floor (current transmission time unit×10/(the number of slots in a radio frame×periodicity of configured grant configuration))]% $M_i$+offset$_i$, where i is the index number of configured grant configuration, $M_i$ is the number of HARQ processes configured in the $i^{th}$ configured grant configuration, offset$_0$=0 when i=0, $$\text{offset}_i = \sum_{j=0}^{i-1} M_j$$

when i>0, where My represents the number of HARQ processes configured in the $j^{th}$ configured grant configuration.

Still taking 4 configured grant configurations shown in FIG. 6 as an example, it is assumed that the HARQ process IDs configured for the Configured Grant configuration 0, Configured Grant configuration 1, Configured Grant configuration 2 and Configured Grant configuration 3 are A, B, C and D respectively, where A, B, C and D respectively represent a set of HARQ process IDs configured for the Configured Grant configuration 0, Configured Grant configuration 1, Configured Grant configuration 2 and Configured Grant configuration 3. It is assumed that the number of HARQ processes configured on the Configured Grant configuration 0 is 2, i.e., $M_0$=2; the number of HARQ process IDs configured on the Configured Grant configuration 1 is 3; the number of HARQ process IDs configured on the Configured Grant configuration 2 is 2; and the number of HARQ process IDs configured on the Configured Grant configuration 3 is 2. When selecting from HARQ process IDs configured for the Configured Grant configuration 0 through the formula, it is assumed that the index number of the Configured Grant configuration 0 is 0, and the CURRENT_symbol corresponding to the first HARQ process of the Configured Grant configuration 0 is 0, that is, the current transmission time unit is 0, and the periodicity of the configured grant configuration is 20 slots, then offset$_0$=0, and the set of values of the HARQ process ID of the Configured Grant configuration 0 is (0, 1) according to the formula: for the Configured Grant configuration 1, the index number is 1, offset$_1$=2, then the set of values of the HARQ process ID is (2, 3, 4); and so on, the set of values of the HARQ process ID on the Configured Grant configuration 2 is (5, 6); the set of values of the HARQ process ID on the Configured Grant configuration 3 is (7, 8).

As can be seen from the above, the HARQ process ID corresponding to each configured grant configuration can also be calculated according to the number of HARQ processes configured by the network side for each configured grant configuration, and the HARQ process IDs calculated for each configured grant configuration are all different values, so the terminal device can arbitrarily select according to different values obtained by calculation, also solving the problem of collision of HARQ process IDs in the prior art.

Figure 7:
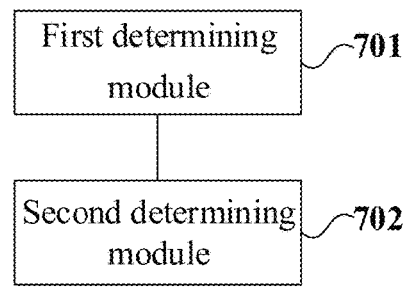
FIG. 7 is a structural block diagram of an apparatus for determining an HARQ process ID provided by an embodiment of the present application.

According to another embodiment of the present application, an apparatus for determining an HARQ process ID is further provided, as shown in FIG. 7, which includes:

a first determining device 701 configured to determine a target parameter, where the target parameter is an index number of a configured grant configuration or a time domain offset from a system frame number of 0 configured in a configured grant configuration or HARQ process information configured in a configured grant configuration; and a second determining device 702 configured to determine an HARQ process ID of an HARQ process corresponding to the configured grant configuration according to the target parameter.

In one embodiment, the second determining device 702 is further configured to: calculate and determine the HARQ process ID of the HARQ process according to a formula of: HARQ process ID=[floor (current transmission time unit/periodicity of configured grant configuration+index number of configured grant configuration)]% the number of HARQ processes of configured grant configuration when the HARQ process is UL transmission.

In one embodiment, the second determining device 702 is further configured to: calculate and determine the HARQ process ID of the HARQ process according to a formula of: HARQ process ID=[floor (current transmission time unit×10/(the number of slots in a radio frame×periodicity of configured grant configuration)+index number of configured grant configuration)]% the number of HARQ processes of configured grant configuration when the HARQ process is DL transmission.

In one embodiment, the second determining device 702 is further configured to: calculate and determine the HARQ process ID of the HARQ process according to a formula of:

HARQ process ID=[floor (current transmission time unit/periodicity of configured grant configuration+time domain offset)]% the number of HARQ processes of configured grant configuration when the HARQ process is UL transmission.

In one embodiment, the second determining device 702 is further configured to: calculate and determine the HARQ process ID of the HARQ process according to a formula of: HARQ process ID=[floor (current transmission time unit×10/(the number of slots in a radio frame×periodicity of configured grant configuration)+time domain offset)]% the number of HARQ processes of configured grant configuration when the HARQ process is DL transmission.

In one embodiment, the HARQ process information configured in the configured grant configuration is HARQ process ID information configured by the configured grant configuration or HARQ process quantity information configured by the configured grant configuration, and the second determining device 702 is further configured to: when the HARQ process information configured in the configured grant configuration includes one HARQ process ID, determine the HARQ process ID configured by the configured grant configuration as the HARQ process ID of the HARQ process.

In one embodiment, the second determining device 702 is further configured to: when the HARQ process information configured in the configured grant configuration includes HARQ process IDs, determine the HARQ process ID of the HARQ process according to the plurality of HARQ process IDs configured by the configured grant configuration.

In one embodiment, the second determining device 702 is further configured to: calculate and determine the HARQ process ID of the HARQ process according to a formula of: HARQ process ID=[floor (current transmission time unit/periodicity of configured grant configuration)]% $M_i$+offset$_i$ when the HARQ process is UL transmission, where i is the index number of configured grant configuration, $M_i$ is the number of HARQ processes configured in the $i^{th}$ configured grant configuration, offset$_0$=0 when i=0, $$\text{offset}_i = \sum_{j=0}^{i-1} M_j$$

when i>0, $M_j$ represents the number of HARQ processes configured in the $j^{th}$ configured grant configuration.

In one embodiment, the second determining device 702 is further configured to: calculate and determine the HARQ process ID of the HARQ process according to a formula of: HARQ process ID=[floor (current transmission time unit× 10/(the number of slots in a radio frame×periodicity of configured grant configuration))]% $M_i$+offset$_i$ when the HARQ process is DL transmission, where i is the index number of configured grant configuration, $M_i$ is the number of HARQ processes configured in the $i^{th}$ configured grant configuration, offset$_0$=0 when i=0, $$\text{offset}_i = \sum_{j=0}^{i-1} M_j$$

when i>0, $M_j$ represents the number of HARQ processes configured in the $j^{th}$ configured grant configuration.

Figure 8:
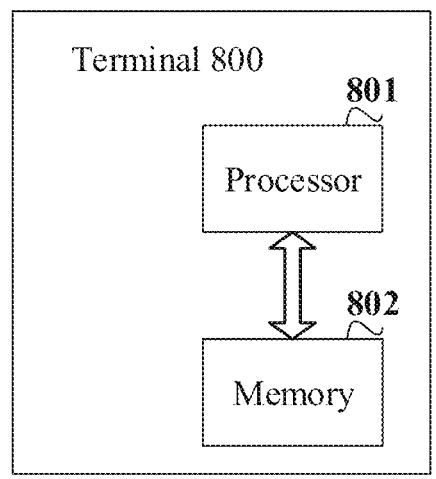
FIG. 8 is a structural block diagram of a terminal provided by an embodiment of the present application.

According to another embodiment of the present application, there is also provided a terminal 800, as shown in FIG. 8, which includes: a processor 801 and a memory 802.

The processor 801 is configured to read a program in the memory 802 to perform the process of:

determining a target parameter, where the target parameter is an index number of a configured grant configuration or a time domain offset from a system frame number of 0 configured in a configured grant configuration or HARQ process information configured in a configured grant configuration; and determining an HARQ process ID of each HARQ process corresponding to the configured grant configuration according to the target parameter.

In one embodiment, the processor 801 is further configured to: calculate and determine the HARQ process ID of the HARQ process according to a formula of: HARQ process ID=[floor (current transmission time unit/periodicity of configured grant configuration+index number of configured grant configuration)]% the number of HARQ processes of configured grant configuration when the HARQ process is UL transmission.

In one embodiment, the processor 801 is further configured to: calculate and determine the HARQ process ID of the HARQ process according to a formula of: HARQ process ID=[floor (current transmission time unit×10/(the number of slots in a radio frame×periodicity of configured grant configuration)+index number of configured grant configuration)]% the number of HARQ processes of configured grant configuration when the HARQ process is DL transmission.

In one embodiment, the processor 801 is further configured to: calculate and determine the HARQ process ID of the HARQ process according to a formula of: HARQ process ID=[floor (current transmission time unit/periodicity of configured grant configuration+time domain offset)]% the number of HARQ processes of configured grant configuration when the HARQ process is UL transmission.

In one embodiment, the processor 801 is further configured to: calculate and determine the HARQ process ID of the HARQ process according to a formula of: HARQ process ID=[floor (current transmission time unit×10/(the number of slots in a radio frame×periodicity of configured grant configuration)+time domain offset)]% the number of HARQ processes of configured grant configuration when the HARQ process is DL transmission.

In one embodiment, the HARQ process information configured in the configured grant configuration is HARQ process ID information configured by the configured grant configuration or HARQ process quantity information configured by the configured grant configuration, and the processor 801 is further configured to: when the HARQ process information configured in the configured grant configuration includes one HARQ process ID, determine the HARQ process ID configured by the configured grant configuration as the HARQ process ID of the HARQ process.

In one embodiment, the processor 801 is further configured to: when the HARQ process information configured in the configured grant configuration includes HARQ process IDs, determine the HARQ process ID of the HARQ process according to the plurality of HARQ process IDs configured by the configured grant configuration.

In one embodiment, the processor 801 is further configured to: calculate and determine the HARQ process ID of the HARQ process according to a formula of: HARQ process ID=[floor (current transmission time unit/periodicity of configured grant configuration)]% $M_i$+$offset_i$ when the HARQ process is UL transmission, where i is the index number of configured grant configuration, $M_i$ is the number of HARQ processes configured in the $i^{th}$ configured grant configuration, $offset_0$=0 when i=0, $$offset_i = \sum_{j=0}^{i-1} M_j$$

when i>0, $M_j$ represents the number of HARQ processes configured in the $j^{th}$ configured grant configuration.

In one embodiment, the processor 801 is further configured to: calculate and determine the HARQ process ID of the HARQ process according to a formula of: HARQ process ID=[floor (current transmission time unit×10/(the number of slots in a radio frame×periodicity of configured grant configuration))]% $M_i$+$offset_i$ when the HARQ process is DL transmission, where i is the index number of configured grant configuration, $M_i$ is the number of HARQ processes configured in the $i^{th}$ configured grant configuration, $offset_0$=0 when i=0, $$offset_i = \sum_{j=0}^{i-1} M_j$$

when i>0, $M_j$ represents the number of HARQ processes configured in the $j^{th}$ configured grant configuration.

In FIG. 8, the bus architecture can include any numbers of interconnected buses and bridges, and specifically link various circuits of one or more processors represented by the processor 801 and the memory represented by the memory 802. The bus architecture may further link various other circuits such as peripheral device, voltage regulator and power management circuit, which are all well known in the art and thus will not be further described again herein.

In one embodiment, the processor 801 may be Central Processing Unit (CPU), Application Specific Integrated Circuit (ASIC), Field-Programmable Gate Array (FPGA) or Complex Programmable Logic Device (CPLD).

According to another embodiment of the present application, there is also provided a computer readable storage medium, which stores a computer program executable by an electronic device. When the program runs on the electronic device, the electronic device performs the steps in the following method:

determining a target parameter, where the target parameter is an index number of a configured grant configuration or a time domain offset from a system frame number of 0 configured in a configured grant configuration or HARQ process information configured in a configured grant configuration; and determining an HARQ process ID of an HARQ process corresponding to the configured grant configuration according to the target parameter.

In one embodiment, when the HARQ process is UL transmission, the determining an HARQ process ID of an HARQ process corresponding to the configured grant configuration according to the target parameter includes:

calculating and determining the HARQ process ID of the HARQ process according to a formula of: HARQ process ID=[floor (current transmission time unit/periodicity of configured grant configuration+index number of configured grant configuration)]% the number of HARQ processes of configured grant configuration.

In one embodiment, if the HARQ process is DL transmission, the determining an HARQ process ID of an HARQ process corresponding to the configured grant configuration according to the target parameter includes:

calculating and determining the HARQ process ID of the HARQ process according to a formula of: HARQ process ID=[floor (current transmission time unit×10/(the number of slots in a radio frame×periodicity of configured grant configuration)+index number of configured grant configuration)]% the number of HARQ processes of configured grant configuration.

In one embodiment, if the HARQ process is UL transmission, the determining an HARQ process ID of an HARQ process corresponding to the configured grant configuration according to the target parameter includes:

calculating and determining the HARQ process ID of the HARQ process according to a formula of: HARQ process ID=[floor (current transmission time unit/periodicity of configured grant configuration+time domain offset)]% the number of HARQ processes of configured grant configuration.

In one embodiment, if the HARQ process is DL transmission, the determining an HARQ process ID of an HARQ process corresponding to the configured grant configuration according to the target parameter includes:

calculating and determining the HARQ process ID of the HARQ process according to a formula of: HARQ process ID=[floor (current transmission time unit×10/(the number of slots in a radio frame×periodicity of configured grant configuration)+time domain offset)]% the number of HARQ processes of configured grant configuration.

In one embodiment, the HARQ process information configured in the configured grant configuration is HARQ process ID information configured by the configured grant configuration or HARQ process quantity information configured by the configured grant configuration.

In one embodiment, the determining an HARQ process ID of an HARQ process corresponding to the configured grant configuration according to the target parameter includes:

when the HARQ process information configured in the configured grant configuration includes one HARQ process ID, determining the HARQ process ID configured by the configured grant configuration as the HARQ process ID of the HARQ process.

In one embodiment, the determining an HARQ process ID of an HARQ process corresponding to the configured grant configuration according to the target parameter further includes:

when the HARQ process information configured in the configured grant configuration includes HARQ process IDs, determining the HARQ process ID of the HARQ process according to the plurality of HARQ process IDs configured by the configured grant configuration.

In one embodiment, when the HARQ process is UL transmission, the determining an HARQ process ID of an HARQ process corresponding to the configured grant configuration according to the target parameter includes:

calculating and determining the HARQ process ID of the HARQ process according to a formula of: HARQ process ID=[floor (current transmission time unit/periodicity of configured grant configuration)]% $M_i$+offset$_i$, where i is the index number of configured grant configuration, $M_i$ is the number of HARQ processes configured in the $i^{th}$ configured grant configuration, offset$_0$=0 when i=0, $$\text{offset}_i = \sum_{j=0}^{i-1} M_j$$

when i>0, $M_j$ represents the number of HARQ processes configured in the $j^{th}$ configured grant configuration.

In one embodiment, when the HARQ process is DL transmission, the determining an HARQ process ID of an HARQ process corresponding to the configured grant configuration according to the target parameter includes:

calculating and determining the HARQ process ID of the HARQ process according to a formula of: HARQ process ID=[floor (current transmission time unit×10/(the number of slots in a radio frame×periodicity of configured grant configuration))]% $M_i$+offset$_i$, where i is the index number of configured grant configuration, $M_i$ is the number of HARQ processes configured in the $i^{th}$ configured grant configuration, offset$_0$=0 when i=0, $$\text{offset}_i = \sum_{j=0}^{i-1} M_j$$

when i>0, $M_j$ represents the number of HARQ processes configured in the $j^{th}$ configured grant configuration.

The above-mentioned computer readable storage medium may be any available media or data storage device accessible to a processor in an electronic device, including but not limited to magnetic memory (e.g., floppy disk, hard disk, magnetic tape, Magnetic Optical disc (MO) or the like), optical memory (e.g., CD, DVD, BD, HVD or the like), semiconductor memory (e.g., ROM, EPROM, EEPROM, nonvolatile memory (NAND FLASH), Solid State Disk (SSD)) or the like.

According to another embodiment of the present application, there is also provided a computer program product. When the instructions in the computer program product run on an electronic device, the electronic device can perform the steps in any above method for determining the HARQ process ID. The above electronic device may be the terminal 800.

For the system/apparatus embodiments, they are substantially similar to the method embodiments, so the description thereof is relatively simple, and the related parts may refer to the partial illustration of the method embodiments.

It Embodiments of the present application can provide methods, systems and computer program products. Thus, the present application can take the form of hardware embodiments alone, software embodiments alone, or embodiments combining the software and hardware aspects. Also, the present application can take the form of computer program products implemented on one or more computer usable storage mediums (including but not limited to magnetic disk memories, CD-ROMs, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which guides the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus, the instructions executed on the computer or another programmable device provide steps for implementing the functions specified in one or more processes of the flow charts and/or one or more blocks of the block diagrams.

What is claimed is:

1. A method for determining a Hybrid Automatic Repeat reQuest (HARQ) process ID, comprising:
   determining, by a terminal device, a target parameter, wherein the target parameter comprises an index number of a configured grant configuration,
   and HARQ process information configured in the configured grant configuration; wherein the HARQ process information configured in the configured grant configuration comprises HARQ process quantity information configured by the configured grant configuration;
   determining, by the terminal device, an HARQ process ID of an HARQ process corresponding to the configured grant configuration according to the target parameter;

wherein when the HARQ process is UL transmission, the determining an HARQ process ID of an HARQ process corresponding to the configured grant configuration according to the target parameter comprises:
calculating and determining the HARQ process ID of the HARQ process according to a formula of: HARQ process ID=[floor (current transmission time unit/periodicity of configured grant configuration)]% $M_i$+offset$_i$, wherein i is an index number of configured grant configuration, $M_i$ is a quantity of HARQ processes configured in an $i^{th}$ configured grant configuration, offset$_0$=0 when i=0, $$\text{offset}_i = \sum_{j=0}^{i-1} M_j$$

when i>0, $M_j$ represents a quantity of HARQ processes configured in a $j^{th}$ configured grant configuration;
wherein when the HARQ process is DL transmission, the determining an HARQ process ID of an HARQ process corresponding to the configured grant configuration according to the target parameter comprises:
calculating and determining the HARQ process ID of the HARQ process according to a formula of: HARQ process ID=[floor (current transmission time unit×10/(a quantity of slots in a radio frame×periodicity of configured grant configuration))]% $M_i$+offset$_i$, wherein i is an index number of configured grant configuration, $M_i$ is a quantity of HARQ processes configured in an $i^{th}$ configured grant configuration, offset$_0$=0 when i=0, $$\text{offset}_i = \sum_{j=0}^{i-1} M_j$$

when i>0, $M_j$ represents a quantity of HARQ processes configured in a $j^{th}$ configured grant configuration.

2. The method of claim 1, wherein when the HARQ process is UL transmission, the determining an HARQ process ID of an HARQ process corresponding to the configured grant configuration according to the target parameter comprises:
calculating and determining the HARQ process ID of the HARQ process according to a formula of: HARQ process ID=[floor (current transmission time unit/periodicity of configured grant configuration+index number of configured grant configuration)]% a quantity of HARQ processes of configured grant configuration.

3. The method of claim 1, wherein when the HARQ process is DL transmission, the determining an HARQ process ID of an HARQ process corresponding to the configured grant configuration according to the target parameter comprises:
calculating and determining the HARQ process ID of the HARQ process according to a formula of: HARQ process ID=[floor (current transmission time unit×10/(a quantity of slots in a radio frame×periodicity of configured grant configuration)+index number of configured grant configuration)]% a quantity of HARQ processes of configured grant configuration.

4. The method of claim 1, wherein when the HARQ process is UL transmission, the determining an HARQ process ID of an HARQ process corresponding to the configured grant configuration according to the target parameter comprises:

calculating and determining the HARQ process ID of the HARQ process according to a formula of: HARQ process ID=[floor (current transmission time unit/periodicity of configured grant configuration+time domain offset)]% a quantity of HARQ processes of configured grant configuration, when the target parameter further comprises a time domain offset from a system frame number of 0 configured in a configured grant configuration.

5. The method of claim 1, wherein when the HARQ process is DL transmission, the determining an HARQ process ID of an HARQ process corresponding to the configured grant configuration according to the target parameter comprises:
calculating and determining the HARQ process ID of the HARQ process according to a formula of: HARQ process ID=[floor (current transmission time unit×10/(a quantity of slots in a radio frame×periodicity of configured grant configuration)+time domain offset)]% a quantity of HARQ processes of configured grant configuration, when the target parameter further comprises a time domain offset from a system frame number of 0 configured in a configured grant configuration.

6. The method of claim 1, wherein when the HARQ process information configured in the configured grant configuration comprises HARQ process ID information configured by the configured grant configuration; the determining an HARQ process ID of an HARQ process corresponding to the configured grant configuration according to the target parameter comprises:
when the HARQ process information configured in the configured grant configuration comprises one HARQ process ID, determining the HARQ process ID configured by the configured grant configuration as the HARQ process ID of the HARQ process;
when the HARQ process information configured in the configured grant configuration comprises a plurality of HARQ process IDs, determining the HARQ process ID of the HARQ process configuration according to the plurality of HARQ process IDs configured by the configured grant configuration.

7. A terminal, comprising: a processor and a memory;
the processor is configured to read a program in the memory to perform a process of:
determining a target parameter,
wherein the target parameter comprises an index number of a configured grant configuration, and
Hybrid Automatic Repeat reQequest (HARQ) process information configured in the configured grant configuration; wherein the HARQ process information configured in the configured grant configuration comprises HARQ process quantity information configured by the configured grant configuration;
determining an HARQ process ID of an HARQ process corresponding to the configured grant configuration according to the target parameter;
wherein when the HARQ process is UL transmission, the determining an HARQ process ID of an HARQ process corresponding to the configured grant configuration according to the target parameter comprises:
calculating and determining the HARQ process ID of the HARQ process according to a formula of: HARQ process ID=[floor (current transmission time unit/periodicity of configured grant configuration)]% $M_i$+offset$_i$, wherein i is an index number of configured grant configuration, $M_i$ is a quantity of HARQ processes configured in an $i^{th}$ configured grant configuration, $offset_0=0$ when i=0, $$offset_i = \sum_{j=0}^{i-1} M_j$$

when i>0, $M_j$ represents a quantity of HARQ processes configured in a $j^{th}$ configured grant configuration;
  wherein when the HARQ process is DL transmission, the determining an HARQ process ID of an HARQ process corresponding to the configured grant configuration according to the target parameter comprises:
    calculating and determining the HARQ process ID of the HARQ process according to a formula of: HARQ process ID=[floor (current transmission time unit×10/(a quantity of slots in a radio frame×periodicity of configured grant configuration))]% $M_i$+$offset_i$, wherein i is an index number of configured grant configuration, $M_i$ is a quantity of HARQ processes configured in an $i^{th}$ configured grant configuration, $offset_0=0$ when i=0, $$offset_i = \sum_{j=0}^{i-1} M_j$$

when i>0, $M_j$ represents a quantity of HARQ processes configured in a $j^{th}$ configured grant configuration.

8. The terminal of claim 7, wherein the processor is further configured to: calculate and determine the HARQ process ID of the HARQ process according to a formula of: HARQ process ID=[floor (current transmission time unit/periodicity of configured grant configuration+index number of configured grant configuration)]% a quantity of HARQ processes of configured grant configuration when the HARQ process is UL transmission.

9. The terminal of claim 7, wherein the processor is further configured to: calculate and determine the HARQ process ID of the HARQ process according to a formula of: HARQ process ID=[floor (current transmission time unit× 10/(a quantity of slots in a radio frame×periodicity of configured grant configuration)+index number of configured grant configuration)]% a quantity of HARQ processes of configured grant configuration when the HARQ process is DL transmission.

10. The terminal of claim 7, wherein when the target parameter further comprises a time domain offset from a system frame number of 0 configured in a configured grant configuration, the processor is further configured to: calculate and determine the HARQ process ID of the HARQ process according to a formula of: HARQ process ID=[floor (current transmission time unit/periodicity of configured grant configuration+time domain offset)]% a quantity of HARQ processes of configured grant configuration when the HARQ process is UL transmission.

11. The terminal of claim 7, wherein when the target parameter further comprises a time domain offset from a system frame number of 0 configured in a configured grant configuration, the processor is further configured to: calculate and determine the HARQ process ID of the HARQ process according to a formula of: HARQ process ID=[floor (current transmission time unit×10/(a quantity of slots in a radio frame×periodicity of configured grant configuration)+time domain offset)]% a quantity of HARQ processes of configured grant configuration when the HARQ process is DL transmission.

12. The terminal of claim 7, wherein when the HARQ process information configured in the configured grant configuration comprises HARQ process ID information configured by the configured grant configuration, the processor is further configured to:
  when the HARQ process information configured in the configured grant configuration comprises one HARQ process ID, determine the HARQ process ID configured by the configured grant configuration as the HARQ process ID of the HARQ process;
  when the HARQ process information configured in the configured grant configuration comprises a plurality of HARQ process IDs, determine the HARQ process ID of the HARQ process according to the plurality of HARQ process IDs configured by the configured grant configuration.

13. A non-transitory computer readable storage medium, wherein the non-transitory computer readable storage medium stores a computer program executable by an electronic device, and the computer program causes the electronic device to perform a method for determining a Hybrid Automatic Repeat reQuest (HARQ) process ID, comprising:
  determining, by a terminal device, a target parameter, wherein the target parameter comprises an index number of a configured grant configuration, and
  HARQ process information configured in the configured grant configuration; wherein the HARQ process information configured in the configured grant configuration comprises HARQ process quantity information configured by the configured grant configuration;
  determining, by the terminal device, an HARQ process ID of an HARQ process corresponding to the configured grant configuration according to the target parameter;
  wherein when the HARQ process is UL transmission, the determining an HARQ process ID of an HARQ process corresponding to the configured grant configuration according to the target parameter comprises:
  calculating and determining the HARQ process ID of the HARQ process according to a formula of: HARQ process ID=[floor (current transmission time unit/periodicity of configured grant configuration)]% $M_i$+$offset_i$, wherein i is an index number of configured grant configuration, $M_i$ is a quantity of HARQ processes configured in an $i^{th}$ configured grant configuration, $offset_0=0$ when i=0, $$offset_i = \sum_{j=0}^{i-1} M_j$$

when i>0, $M_j$ represents a quantity of HARQ processes configured in a $j^{th}$ configured grant configuration;
  wherein when the HARQ process is DL transmission, the determining an HARQ process ID of an HARQ process corresponding to the configured grant configuration according to the target parameter comprises:
  calculating and determining the HARQ process ID of the HARQ process according to a formula of: HARQ process ID=[floor (current transmission time unit×10/(a quantity of slots in a radio frame×periodicity of configured grant configuration))]% $M_i$+$offset_i$, wherein i is an index number of configured grant configuration, $M_i$ is a quantity of HARQ processes configured in an $i^{th}$ configured grant configuration, $offset_0=0$ when i=0, $$offset_i = \sum_{j=0}^{i-1} M_j$$

when i>0, $M_j$ represents a quantity of HARQ processes configured in a $j^{th}$ configured grant configuration.

\* \* \* \* \*